United States Patent [19]

Sticht

[11] Patent Number: 5,103,963
[45] Date of Patent: Apr. 14, 1992

[54] ASSEMBLY METHOD AND SUPPORT

[75] Inventor: Walter Sticht, Attnang-Puchheim, Austria

[73] Assignee: STIWA-Fertigungstechnik Sticht GesmbH, Attnang-Puchheim, Austria

[21] Appl. No.: 609,071

[22] Filed: Oct. 30, 1990

Related U.S. Application Data

[63] Continuation of Ser. No. 302,055, Jan. 26, 1989, abandoned, which is a continuation of Ser. No. 180,591, Apr. 5, 1988, abandoned, which is a continuation of Ser. No. 885,332, Jul. 14, 1986, abandoned, which is a continuation of Ser. No. 592,368, Mar. 22, 1984, abandoned.

[30] Foreign Application Priority Data

Apr. 21, 1983 [AT] Austria .................................. 1433/83

[51] Int. Cl.⁵ ............................................ B65G 37/00
[52] U.S. Cl. .................................. 198/465.1; 29/33 P; 29/430; 29/799; 29/824
[58] Field of Search .... 198/345.3, 346.1, 465.1–465.3, 198/803.01, 803.2; 29/429, 430, 791, 799, 822–824, 33 P

[56] References Cited

U.S. PATENT DOCUMENTS

| | | | |
|---|---|---|---|
| 3,530,571 | 9/1970 | Perry | 198/472 |
| 3,538,997 | 11/1970 | Christine et al. | 198/803.01 |
| 4,014,428 | 3/1977 | Ossbahr | 198/472 |
| 4,049,500 | 9/1977 | Kamm | 198/345 |
| 4,274,196 | 6/1981 | Lemmer | 29/823 |
| 4,306,646 | 12/1981 | Magni | 198/346.1 |
| 4,378,741 | 4/1983 | Nagahori | 198/465.1 |
| 4,444,303 | 4/1984 | Burgess, Jr. | 198/345 |
| 4,473,935 | 10/1984 | Tatsuura et al. | 198/472 |
| 4,475,642 | 10/1984 | Fritz | 198/465.1 |
| 4,489,821 | 12/1984 | Inaba et al. | 198/346.1 |

FOREIGN PATENT DOCUMENTS

| | | | |
|---|---|---|---|
| 56-39844 | 4/1981 | Japan | 29/430 |
| 57-71741 | 5/1982 | Japan | 29/824 |

*Primary Examiner*—Joseph E. Valenza
*Attorney, Agent, or Firm*—Kurt Kelman

[57] ABSTRACT

In a system for fully automatically assembling a plurality of parts into a workpiece, each part is conveyed to the respective work stations in a holder which is associated with the workpiece at the work station where the part is removed from the holder and assembled.

6 Claims, 3 Drawing Sheets

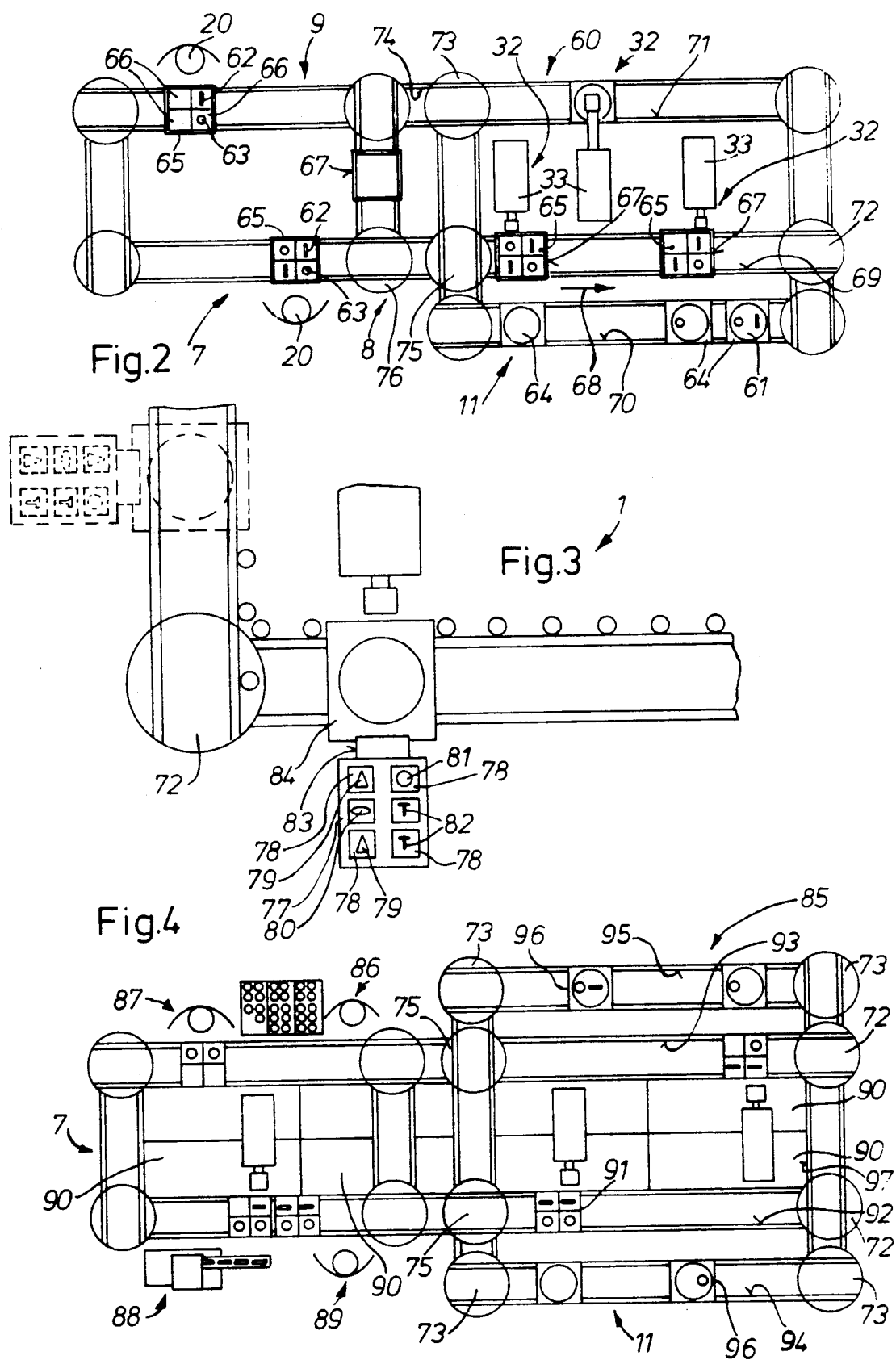

ASSEMBLY METHOD AND SUPPORT

This is a continuation of my copending application Ser. No. 302,055, filed Jan. 26, 1989, which is a continuation of my abandoned application Ser. No. 180,951, filed Apr. 5, 1988, which was a continuation of my abandoned application Ser. No. 855,332, filed July 14, 1986, which was a continuation of my abandoned application Ser. No. 592,368, filed Mar. 22, 1984.

The present invention relates to improvements in a method and arrangement for assembling a plurality of parts to manufacture a workpiece, preferably by a fully automatic assembly procedure along an assembly line wherein the parts are conveyed between sequential work and/or processing stations. The assembly parts may be held in storage stations along the conveyor path and the workpiece is held on an assembly support at the work stations for assembling the parts.

Assembly lines of this general type have been disclosed, for example, in my copending U.S. Pat. No. 4,502,585, filed Nov. 7, 1979, and U.S. Pat. No. 4,492,297, filed Apr. 23, 1980. In such assembly lines, workpieces are held on assembly supports and these assembly supports are advanced along the conveyor path from work station to work station. Manipulating devices at the work stations take respective assembly parts from waiting stations along a fully automatic parts conveyor and place them on the workpieces for assembly therewith, for example, by screwing, riveting, welding or the like. Such assembly lines, wherein the respective assembly supports are independently moved along a conveyor path from one work station to the next, have been very successfully used for the fully automatic assembly of complex structural pieces comprised of a great many individual parts, requiring many different work and/or processing stations. However, they could not be used in certain cases since they were not sufficiently flexible for adaptation to changing numbers of pieces or types of products, despite the provision of intermediate work stations where parts could be manually delivered and/or assembled.

It is the primary object of this invention to improve such an assembling method and arrangement in a manner designed to provide a very simple system assuring the proper delivery of the parts to the work station in an economic manner adapted to the automated assembly of the parts at each work and/or processing station.

It is another object of the invention to provide an assembly line which is flexible enough to adapt to changing and different numbers and types of parts and workpieces.

The above and other objects are accomplished according to one aspect of the present invention with a method of assembling a plurality of parts to manufacture a workpiece, which comprises the steps of placing individual ones of said parts in respective holders for the individual parts in a preparation stage, conveying the respective holders in a conveying path from the preparation stage to a respective work station, removing the individual part from the respective holder at the respective work station, and manipulating the removed part at the work station.

For this purpose, this invention provides an arrangement for assembling a workpiece, which comprises an assembly line including a series of sequentially arranged work stations, means for manipulating the parts at the work stations, holders for each individual one of said parts, a preparation stage spaced from the work stations for placing the parts in the holders, conveyor means connecting the preparation stage and the work stations for conveying the holders with the individual parts to the work stations, means for positioning the holders for assembly at the work stations, and means for manufacturing the parts for removal from their holders and assembly at the work stations.

By providing the unexpectedly simple insight of associating holders for the individual parts with the workpieces or the assembly supports on which the workpieces are assembled with the parts, the holders containing individual parts ready for the sequential assembly in successive work stations after they have been removed from their holders at the work stations, the invention enables the assembly system to be universally adapted for use with like workpieces of different series and with increasing or changing numbers of pieces. This is possible because the individual parts may be manually placed or positioned in their holders in a preparation stage when the number of pieces is small or the types of products change while other parts or all parts may be fully automatically delivered, singled and placed in the holders in another series production or when a greater number of parts are involved. Furthermore, the usefulness of the assembly line is enhanced because the individual parts may be suitably pre-positioned in their holders, independently of the positioning of the workpiece so that the fully automatic assembly is not interrupted when, for example, difficulties arise in the removal of parts from a fully automatic delivery device or a short interruption of the work of service personnel at a manual work station. Very importantly, such an assembly system may also be in operation outside normal production times in "ghost shifts" since the manual operating procedures may be effected during the normal work shift, the parts in their holders may be stored in an intermediate station and the parts may be fully automatically delivered from the intermediate station to the work station where they are assembled.

The above and other objects, advantages and features of the present invention will become more apparent from the following detailed description of certain now preferred embodiments, taken in conjunction with the greatly simplified and generally schematic accompanying drawing wherein FIG. 1 is a top view of an assembly line according to one embodiment of this invention;

FIG. 2 is a like view of another embodiment;

FIG. 3 is a like fragmentary view showing an assembly support with an associated carrier for a plurality of holders for individual parts at a turning point of the conveyor path for the assembly support;

FIG. 4 is a view similar to that of FIGS. 1 and 2, showing a third embodiment;

Figure 1:
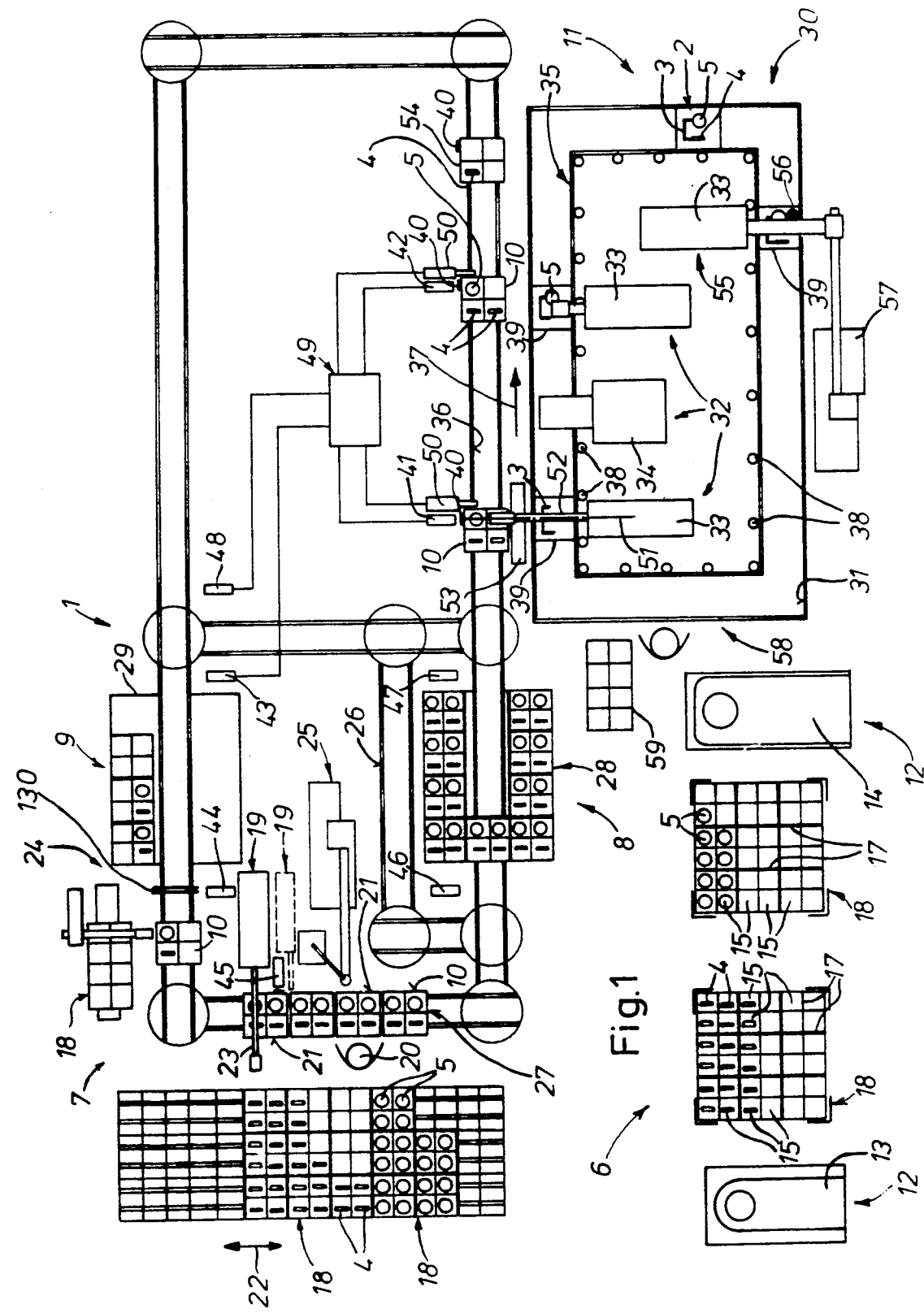

Referring now to the drawing and first to FIG. 1, there is shown arrangement 1 for assembling workpiece 2 from individual parts 3, 4 and 5. The entire arrangement for producing workpieces 2 comprises production stage 6 for parts 4 and 5, preparation stage 7 for parts 4, 5, storage stations 8 and 9 for transport carriers 10 of holders 15 to be loaded with the individual parts and for carriers with loaded holders, respectively, and assembly stage 11 where individual parts 3 to 5 are assembled into workpiece 2.

Production stage 6 includes processing stations 12 which may comprise, for example, turning machines or lathes 13 and drilling machines 14 designed to prepare suitable assembly parts. Each processed part 4, 5 is placed in a respective holder 15, these holders consisting, for example, of cup-shaped containers of synthetic resin set in mounts 17 of transportable packs 18. This arrangement enables the holders to be adapted at low cost and rapidly to variously shaped parts, as needed for the production of different types of like workpieces, the holders being shaped to conform to the shapes of the parts to be held therein. Furthermore, the parts may be transported from their production stage to the assembly stage in the same holders, thus further reducing the costs of storage and handling.

After all holders 15 have been loaded with parts 4 and 5, packs, 18 are moved to preparation stage 7. At this stage, transport carriers 10 and 21 are loaded with holders 15 containing parts 4, 5 by means of automatic manipulating devices 19 or manually by operators 20. To enable manipulating devices 19 to be as simple as possible and to save the costs of robots freely movable in several directions, it is proposed adjustably to arrange packs 18 for positioning in a longitudinal direction indicated by double-headed arrow 22 and transport carriers 10, 21 for positioning transversely to guide path 23 of manipulating devices 19. In this manner, the manipulating devices require only one additional guide path in a vertical direction for properly positioning holders 15 with their parts 4, 5 in the carriers.

After all holders 15 have been removed from packs 18, the empty packs may be moved to removal station 24 where emptied holders 15 are placed in the packs. However, if the operating cycle provides sufficient time, it is also possible to use a series of adjacently mounted manipulating devices 19 (as shown in broken lines) for removing emptied holders from transport carriers 10, 21 and to place them in packs 18 at stage 7. Furthermore, parts delivered in bulk form, such as screws, coil springs, stamped parts and the like, may be placed in holders 15 by a conveying device 15 which is designed to disentangle, single and orient these parts on their way to the holders. This enables fragile parts which tend to become entangled to be delivered singly to their respective holders. This arrangement is flexibly adapted to various numbers of production pieces and to deliver very fragile parts, which could be damaged by manual handling, fully automatically by vibratory conveyors at relatively low costs while parts whose handling is complex but whose small numbers do not warrant the use of automatic singling devices may be placed manually.

Holders 15 in transport carriers 10, 21 may be loaded with individual parts 4, 5, for example, by passing a group 27 of carriers several times by manipulating devices 19 or operator 20, using shunt conveyor path 26 for this purpose, placing only like parts 4 or 5, or holders 15 containing such like parts, at each pass. This enables the most varigated parts to be handled very simply since standardized holders may be used which may be handled with the same manipulating devices. This does away with the requirement for different manipulating devices and grippers. Another advantage of using replaceable holders is that the arrangement may be readily adapted to different workpieces and parts. The costs involved in the manipulation of the parts from the processing stage to the assembly are thus considerably reduced since the parts retain their pre-selected position in the holders up to the point of assembly without requiring intervening gripping or handling. This is of outstanding advantage in the handling of fragile parts which may be readily damaged, such as gold-coated parts. Groups 27 of carriers are loaded with one type of parts in one pass and the same group of carriers is loaded in a subsequent pass with another type of parts, and each loaded group of carriers is then moved to storage station 8. This is a very cost-saving procedure and is of particular advantage with the use of manipulating devices or robots which are programmed for movements in three directions at the work stations. In such assembly lines, several parts are usually assembled in sequence so that the time of the cycle is relatively short. The described arrangement enables such robot assembly stations to be supplied with parts at a low investment cost. Furthermore, the storing of the individual parts in exactly pre-determined positions makes a better use of the robots possible since the same may be operated in a third shift, the loading of the parts being effected in two normal operating shifts while the loaded parts can be automatically called to the work station from the storage station by the robot.

While transport carriers 10, 21 are loaded in stage 7, previously loaded carriers held on storage device 28 in storage station 8 may be moved from the storage station along conveyor path 36 to assembly stage 11. After transport carriers 10, 21 have been unloaded at assembly stage 11, the emptied carriers are received in storage device 29 and recycled to storage station 9 for subsequent loading at preparation stage 7. With the use of storage devices 28, 29, it is possible to load a sufficient number of transport carriers 10, 21 with holders 15 containing parts 4, 5 in two operating shifts to have a sufficient number of such parts available for the assembly of workpieces 2 in a third, fully automated shift, which requires no operators.

Assembly stage 11 comprises apparatus 30 for assembling workpieces 2. The assembly stage has endless conveyor path 31 along which a succession of work or processing stations 32 are arranged. Manipulating devices 33 or processing devices 34, such as riveting machines, presses, screw driving machines, welding machines or the like, are mounted at stations 32. Conveyor path 36 for parts transport carriers 10, 21 extends parallel to leg 35 of conveyor path 31. Means 38, illustrated as driven rollers, are arranged along conveyor path 31 to advance assembly supports 39 in a conveying direction indicated by arrow 37 from station to station, transport carriers 10, 21 advancing in the same direction along conveyor path 36. Conveyor path 31 and driving means 38 for the assembly supports may take any suitable form, for example that described in my above-mentioned U.S. patents or my U.S. Pat. No. 4,530,287, filed Mar. 1, 1983.

Carriers 10, 21 are properly aligned with the assembly supports at the work stations for the removal of parts 4, 5 from holders 15 by the cooperation of signal carrier means 40 affixed to transport carriers 10, 21 with signal reading and coding means 41 to 48. Control 49 is connected to the signal reading and coding means to receive suitable control signals therefrom and transmits the control signals to stops 50 associated with signal reading and coding means 41, 42 and connected to the control for the proper positioning of transport carriers 10, 21 so that part 5 is centered on axis 51 of gripper arm 52 of manipulating device or robot 33. Gripping arm 52 is movable only along axis 51 and in a vertical direction to place part 5 on assembly support 39 so that this part may be assembled with part 3 on this support. If part 5 does not meet the required quality standard or if an assembly of this part with part 3 is not possible, the defective part may be thrown into receptable 53 and gripper arm 52 is operated to remove another part 5 and to assemble it with part 3. In this case and as is shown in connection with transport carrier 54, only a single part 4 remains on the carrier. This has the advantage that even the presence of a defective assembly part will not interfere with the assembly operation since this defective part is simply rejected and the assembly of workpiece continues with another part on the carrier.

Reading and coding means 41, 42 enable the transport carrier for the individual parts to be properly aligned with respect to robot 33 and, in addition, the control may be so programmed that signal carrier means 40 on the transport carriers will show any repeating motion of gripper arm 52, i.e. that an additional part has been removed from the transport carrier, so that reading and coding means 45 will suitably operate manipulating device 19 during a subsequent loading of the transport carrier at stage 7. The coding means may take any suitable form and such means as magnetic coding tapes, mechanically adjustable signal carrier means and the like are well known to those skilled in the art. This arrangement enables the assembly line to be readily controlled and monitored with respect to the storage and the assembly of the parts, as well as a quality control for the assembled workpieces. This reduces the manual work involved in such operations.

After assembly parts 4, 5 have been removed from their holders in the transport carriers, the carriers are returned to preparation stage 7, possibly with an intermediate storage in station 9. In the illustrated embodiment, assembly stage 11 comprises not only work stations 32, at which manipulating devices 33 grip and assemble parts 4 and 5, but also processing station 34 between two work stations, at which a welding machine, for example, may weld parts 3 and 5 together before part 4 is assembled with the welded parts at the next work station. At a further work station 55, delivery device 57 moves parts 56 from a supply bin to the work station where manipulating device 33 assembles part 56 with the workpiece on assembly support 39. If desired, additional parts, such as screws, discs, springs and the like, may also be delivered in bulk to work stations 32, where parts 4 and 5 are assembled, and these additional parts may be assembled with manipulating devices 33 on assembly support 39. Assembly line arrangement 1 is very advantageous in the assembly of workpieces from several parts because difficulties are avoided in the delivery and removal of assembly parts coming from a storage bin in bulk, the parts in the arrangement of the present invention arriving at the work or processing station in individual holders in an at least coarsely pre-positioned condition ready for assembly. Furthermore, it is now possible in a surprisingly simple manner to monitor any trouble spots centrally if the delivery devices for the assembly parts are concentrated at the preparation stage. A single operator at this point suffices to take care of any interruption and the production at assembly stage 11 proceeds unhindered and without delay, particularly if a supply of transport carriers 10, 21 filled with parts 4, 5 is stored at station 8 between preparation stage 7 and assembly stage 11. In addition, access to the work and processing stations is facilitated because they are not encumbered by parts delivery devices.

Another considerable advantage resides in the fact that the assembly arrangement may be adapted readily to different production conditions. It can be used economically even if only a relatively small number of pieces is to be assembled since no expensive delivery devices for the assembly parts are required and the parts may be loaded onto the carriers and removed at assembly stage 11 by a few operators. As the production rate increases, the number of operators may be increased or the placement of holders 15 in transport carriers 10, 21 and/or the loading of the holders with parts 4, 5 may be automated, the manipulation of the parts from their initial processing to the assembly being reduced to a minimum with the use of replaceable, standardized parts holders 15. With such standardized holders, the manipulating devices with their grippers may be standardized correspondingly so that the costs of the entire installation are greatly reduced. Since the parts may be pre-positioned in their holders ready for automatic assembly, it is possible to make the parts ready during the normal day shifts while they may then be assembled in a "ghost" shift in a fully automated procedure. Experience has shown that most of the trouble occurs during the singling, positioning and delivery of the parts and that the assembly can be done automatically without the presence of operators.

The operation of assembly arrangement 1 will partly be obvious from the above description of its structure and will now be more fully explained.

Parts 4, 5 are processed at processing stations 12 and the finished parts are loaded into empty holders 15 held ready at the processing stations in packs 18. After each holder 15 of a pack has been loaded with a respective finished part, the pack is transported to preparation stage 7 for loading transport carriers 10, 21 with holders 15 each containing a part. A supply of loaded packs 18 may be stored, if desired, before the packs are brought to stage 7.

Figure 5:
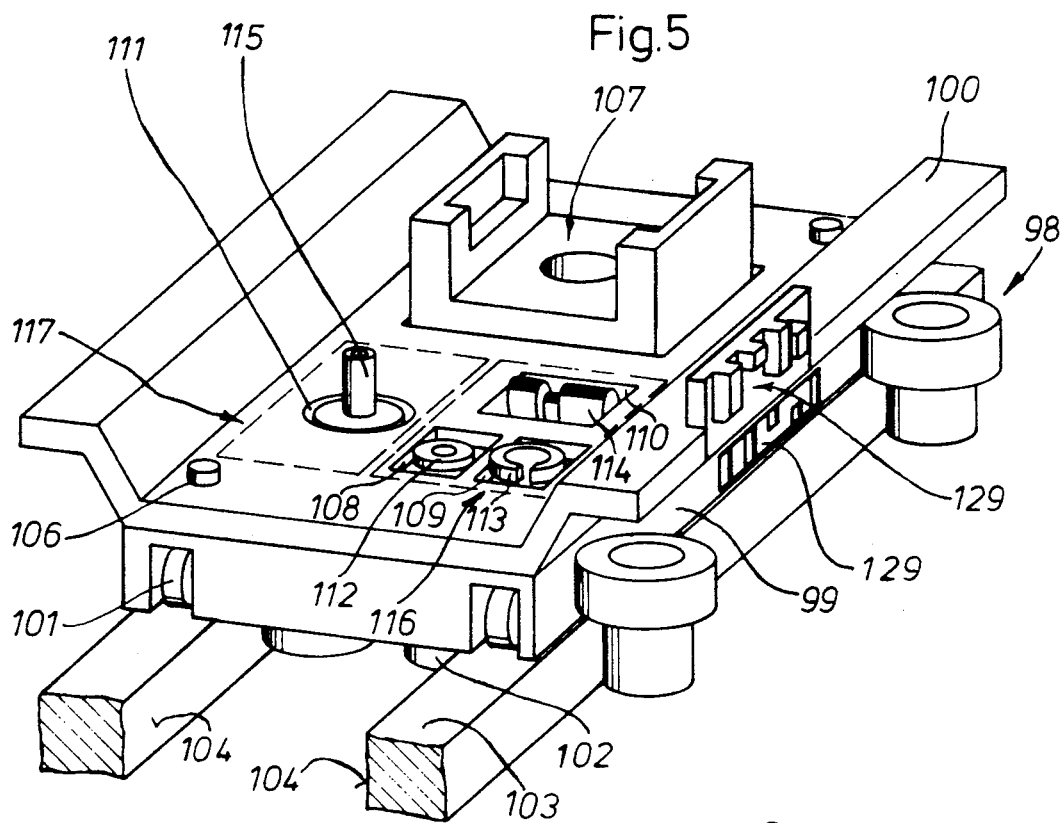
FIG. 5 is an enlarged perspective view of an assembly support with an emplaced assembly pallet and individual parts arranged thereon.
Figure 6:
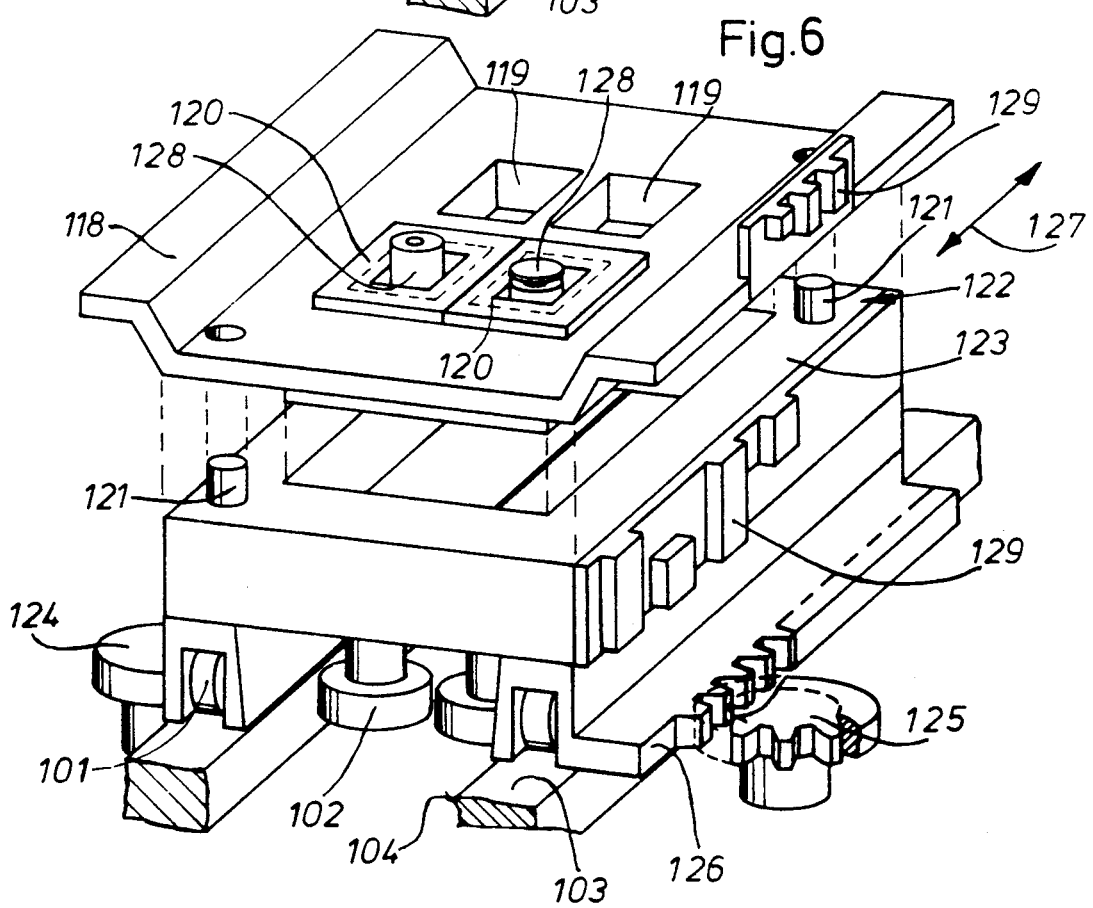
FIG. 6 is a like perspective view of a pallet adapted to receive a carrier for the holders of individual parts at a work station, also showing positioning and stopping means for the carrier.

At the preparation stage, operator 20 or partially or fully automated manipulating devices 19 take holders 15 out of pack 18 and load them into transport carriers 10, 21. If desired, these transport carriers may be assembly supports equipped with proper receptacle areas or mounts for the holders, as shown in FIGS. 5 and 6. In addition, delivery device 25 may deliver singled parts from a storage bin where they are stored in bulk and deposit the singled and oriented parts in respective holders 15. Loaded carriers 10, 21 are then conveyed to storage station 8 where they are held in storage device 28 ready for use at the assembly stage. While the use of only two different parts 4, 5 is shown and described for the sake of clarity, it will be obvious to those skilled in the art that any number of such different parts may be handled in an equivalent manner, depending on the nature of the specific workpiece to be assembled and in the order required by the assembly. As will be obvious from the following explanation of the assembly at stage 11, it is advantageous, as illustrated, if two sets of like parts 4, 5 are loaded on each carrier.

If desired, each transport carrier 10, 21 may be passed through preparation stage 7 several times by the use of parallel conveyor path 26 and only like parts are loaded during each pass, which reduces the number of manipulating devices or operators needed at the preparation stage.

When parts are needed at assembly stage 11, respective transport carriers 10, 21 are advanced along conveying path 36 from storage station 8 to the assembly stage in the direction of arrow 37 and parallel to leg 35 of conveying path 31 for assembly support 39. If desired, however, transport carriers 10, 21 may be moved to the work stations at the assembly stage in any other suitable direction. At the work stations, the transport carrier is properly aligned with respect to axis 51 in the manner described hereinabove and manipulating device 33 is operated to lift each individual part out of its holder 15 and to place it for assembly on assembly support 39. If any part is found to be defective and cannot be used in the assembly of the workpiece, the manipulating device will be used to move the defective part into receptacle 53. Since, as above described, a second reserve set of the same parts is provided on each transport carrier, the defective part is readily replaced by the reserve part without interruption of the assembly operation, this reserve part now being gripped by manipulating device 33 and assembled therewith. This arrangement further enhances the usefulness of the assembly line according to this invention and considerably expedites the assembly with a simple repetition of the manipulating device operation for replacing a defective part with a reserve part from the same carrier.

However, if the transport carrier carries only a single part, it is merely advanced after the defective part has been removed and the next transport carrier is moved to the work station for supply of a part. Since the transport carrier with the parts moves independently of assembly support 39, this replacement of a defective assembly part by a proper part can be effected without difficulty.

The means for advancing transport carriers 10, 21 along conveying path 36 from work station to work station may be the same as that used for moving assembly support 39 along conveying path 31. In the illustrated embodiment, after part 5 has been placed on assembly support 39 for assembly with part 3, the assembly support is advanced to next station 32 where a processing machine, such as a welding machine, will unite the two parts. The assembly support is then moved to next work station 32 where manipulating device 33 will remove part 4 from suitably centered transport carrier 10 and will place it on the assembly support for assembly with assembled parts 3 and 5. The empty transport carrier 54 is then conveyed to intermediate storage station 9 or directly to preparation stage 7 for loading to be ready for the next operating cycle. At the same time, assembly support 39 is conveyed along path 31 past another work station 55, if required, where another part 56 may be delivered by delivery device 57 for assembly with workpiece 2. The assembled workpiece is then manually removed from assembly support 39 at station 58 whence the empty assembly support is recycled to the work stations while the assembled workpiece may be placed into holders of pack 59. If this is not a complete workpiece and requires assembly with additional parts, this pack may now be moved to preparation stage 7 where this partially assembled workpiece now is used as a part for assembly of a larger workpiece.

This arrangement provides an even flow of all parts in the assembly of multi-part workpieces and partially assembled workpieces may form the parts in an assembly of more complex workpieces manufactured at a different production site, all parts being kept in proper order in their respective individual holders so that they may always be handled by standard manipulating devices or robots. At removal station 24 arranged between storage station 9 and preparation stage 7, all empty holders 15 are removed from their carriers and these empty holders are placed in empty packs 18. The holders can then be loaded with parts again and the carriers are loaded with these holders in a subsequent assembly cycle.

In arrangement 60 of FIG. 2, workpiece 61 is assembled from parts 62, 63. The parts are contained in holders 66 on individual parts transport carrier 65 mounted on pallet 67 which is moved in the direction of arrow 68 in conveying path 69 independently of assembly support 64 moved in the same direction in conveying path 70. In contrast to the embodiment of FIG. 1, conveying path 69 for the parts transport carrier runs between, and parallel to, conveying paths 70 and 71 along assembly stage 11. While pallets 67 for individual parts transport carriers 65 advance along conveying path 69 past work stations 32 where they are aligned with manipulating devices 33 for removing the parts from their holders and assembling them, they are subsequently switched at station 72 to conveying path 71 for assembly supports 64 where they move along to station 72 where they are switched to conveying path 74 while the assembly supports return to conveying path 70. Conveying path 74 leads to storage station 9 whose function has been described in connection with arrangement 1 of FIG. 1. At switching station 73, assembled workpieces 61 are taken off assembly supports 64 before the assembly supports are recycled. Loaded carriers 65 are moved from preparation stage 7 (whose function has been described in connection with FIG. 1) to conveying path 69 through crossing 75 where the conveying paths for the parts transport carrier and for the assembly support intersect. If individual parts transport carriers 65 are arranged to be lifted off pallet 67, it is advantageous if only those carriers 65 are lifted off pallet 67 which have empty holders and these transport carriers are then stored and later loaded again. The somewhat more heavily constructed pallets 67 are shunted off directly to storage station 8 (whose function has been described hereinabove in connection with FIG. 1) and loaded transport carriers 65 are placed thereon at this station for conveyance to assembly stage 11. This will considerably increase the storage capacity at relatively low cost since only the cheaply constructed individual parts transport carriers 65 will have to be available in large numbers while only relatively few expensive pallets 67 are needed. Operators 20 (or manipulating devices) will remove empty holders 66 from transport carriers 65 and load the transport carriers. Empty pallets 67 are supplied at switching station 76 where the loaded carriers 65 are placed thereon for movement through crossing 75 to the assembly station. As has been explained hereinabove in connection with the embodiment of FIG. 1, it is advantageous to provide each part 62, 63 in two sets, one serving as reserve if the other part is defective. To enable these parts to be in the proper position at the work station not only during the first pass when the defective part is discovered and discarded but also during a second pass when the reserve part is used, like parts 62 and 63 are diagonally arranged on transport carrier 65. In this manner, simple turning of transport carrier 65 by 180° will place each reserve part in the correct position for handling at the work station.

FIG. 3 illustrates arrangement 1 wherein parts transport carrier 77 has holders 78 for different parts 79 to 82 mounted thereon. After transport carrier 77 has been loaded, it is attached to assembly support 84 by means of mounting device 83 which properly aligns or positions transport carrier 77 with respect to support 84. Preferably and as shown, the parts transport carrier is attached to the assembly support at a side thereof facing away from the center of the assembly station so that the assembly transport carrier may readily pass through switching station 72. This arrangement provides a very simple means of associating the parts with the workpiece to be assembled therefrom. Also, it does away with a special conveyor system for the parts since they are conveyed with the assembly support along the same conveying path while, at the same time, assuring proper alignment of the parts with the workpiece.

As shown in the drawing, parts 79 and 82 are provided in two sets to provide a reserve, experience having shown that these particular parts are frequently defective. Contrary to the embodiment of FIG. 2, no expensive carrier pallet is needed for parts carrier 77.

In arrangement 85 illustrated in FIG. 4, preparation stage 7 comprises discharge station 86 and three loading stations 87, 88, 89. The same assembly line modules 90 are used at the preparation stage and assembly stage 11. As has been more fully described in my above-identified patents, each module comprises its own conveyor section, drive, power plant and control for conveying respective supports along the assembly line. In contrast to the embodiments of FIGS. 1 and 2, two conveying paths 92, 93 are provided for parts transport carrier 91 in assembly stage 11 and the parts transport carriers are moved along these paths independently of assembly supports 96 moving along conveying paths 94, 95. A common conveying path 97 connects conveying paths 92, 93 and 94, 95. As has been described in connection with FIG. 2, the conveying paths are connected by switching stations 72 and 73 and crossing station 75.

FIG. 5 illustrates assembly support 98 comprised of pallet 99 and assembly plate 100 mounted thereon by means of pins 106. The assembly support is mounted for movement along a conveying path defined by guide surfaces 103, 104 engaged by guide elements, i.e. rollers 101, 102, which hold the assembly support against displacement in a lateral and vertical direction. Drive rollers frictionally engage the side faces of pallet 99 to advance the assembly support along the conveying path. Assembly plate 100 has workpiece holder or receptacle 107 wherein the workpiece is assembled. Holders 108 to 111 for individual assembly parts 112 to 115 are arranged adjacent workpiece holder 107 so that the parts are associated in alignment with the workpiece when they are removed from their holders and assembled at respective work stations. Individual parts 112 to 115 are suitably positioned in their holders at a preparation stage spaced from the assembly stage in a manner described hereinabove. As has been explained in connection with FIG. 1, it would also be possible to place the parts in holders 116, 117 replaceably mounted in assembly plate 100. This embodiment, wherein a portion of mounting plate 100 forms a transport carrier for the holders, is particularly useful if the workpiece holder has a relatively simple structure and, therefore, is a simple component of the assembly support. If the complexity of the workpiece to be assembled requires an elaborate and expensive workpiece holder 107, economic considerations favor separate assembly and parts transport carriers.

FIG. 6, wherein like reference numerals designate like parts, shows parts transport carrier 118 with receptacles 119 for replaceable holders 120 for parts 128. The parts transport carrier is mounted on support 122 by guide pins 121. Support 122 has rectangular frame 123 carrying guide rollers 101, 102. Instead of, or in addition to, frictionally engaging drive rollers 124, a gear-and-ratchet drive 125, 126 may be provided for advancing the support along the conveying path and to stop it in a desired position. Drive gear 125 meshes with ratchet 126 on a ledge of the assembly support. This enables the parts transport carriers on the support to be centered in the directions indicated by double-headed arrow 127 with respect to the axis of a manipulating device, as has been explained in connection with FIGS. 1 and 2, so that parts 128 may be removed from holders 120 at the work station by a manipulating device which is movable only in two directions. For a better understanding, some receptacles 119 have been illustrated without replaceable holders 120 but it will be understood that, under normal operating conditions, all receptacles will be filled with holder containing assembly parts 128.

As has been shown in FIGS. 5 and 6, it is advantageous if assembly plate 100 or equivalent parts transport carrier 118 and pallet 99 or equivalent support 122 are separately equipped with signal transport carrier means 129 for cooperation with the signal reading and coding means described hereinabove. The reading and coding means are programmed to determine from the received signals what type of carrier passes. If the parts are suitably coded to differentiate the same from all other parts in the system, the path of the respective carriers can be followed and suitable signals will indicate, for example, before the parts carriers reach the preparation stage which of the holders need to be replaced or loaded. For example, as shown in FIG. 1, a signal receiving interrogator station, such as a portal 130 through which carrier 54 passes from storage station 9 to preparation stage 7, may determine in dependence on the received signal which holders must be replaced or loaded. The resultant information may be signaled to the preparation stage so that operator 20 will know how many parts of each type must be loaded on the carrier when it arrives there. Alternatively, this signal may operate manipulating devices 19 for the fully automatic loading of, transport carriers 10, 21. At the same time, the coding will properly position the parts transport carriers at the work station, monitor the progress of the assembling operations, and mark those assembly supports on which a defective assembly has been effected to cause the central control to move such assembly supports to repair stations and/or to eliminate such defective workpieces.

It will be understood that any suitable type of conveyor and/or drive means may be used for the parts transport carriers and the assembly supports, including chain conveyors, conveyor belts, roller conveyors and the like. Similarly, any type of processing and/or work stations, as well as manipulators for the parts, may be used. If the parts transport carriers and/or the parts holders and/or the assembly plates are replaceably mounted, the assembly line arrangement will be adaptable to various operating conditions at low cost.

What is claimed is:

1. An arrangement for assembling a plurality of parts to manufacture a workpiece, which comprises an assembly line including
   (a) a preparation stage,
   (b) sequentially arranged work stations spaced from the preparation stage,
   (c) a plurality of conveying paths connecting the work stations to the preparation stage,
   (d) like conveying means for transport carriers for holders of individual ones of said parts and assembly supports for advancing the transport carriers and assembly supports along the conveying paths from the preparation stage to the work stations, and
   (e) a device for manipulating the parts at each work station for removing the individual parts from the holders and for placing them on the assembly support for assembly thereon,
      (1) the conveying paths including separate paths extending parallel to each other adjacent the manipulating devices for separately conveying the transport carriers and the assembly supports and a common conveying path for the transport carriers and assembly supports connected to the parallel separate paths in a conveying direction,
      (2) crossing stations connecting the parallel conveying paths and the common conveying path to conveying paths leading from and to the preparation stage, and
      (3) each manipulating device including a gripper arm arranged between the parallel conveying paths adjacent thereto and vertically movable only along a vertical axis.

2. The arrangement of claim 1, wherein the holders are cup-shaped, some of the cup-shaped holders holding like ones of said parts while other cup-shaped holders hold different ones of said parts all in the same plane.

3. The arrangement of claim 1, wherein the assembly support has mounted thereon holders for receiving the parts from the manipulating device and a holder aligned therewith for assembling the parts on the aligned assembly support holder.

4. The arrangement of claim 1, further comprising mounts on the transport carrier for replaceably receiving the holders.

5. The arrangement of claim 1, wherein a plurality of holders for different ones of said parts are replaceably mounted on each transport carrier, each holder receiving a single individual part in a predetermined position at the preparation stage.

6. The arrangement of claim 1, wherein the conveying means comprises a conveyable support comprising guide rollers conveying supporting the support on the conveying path against displacement in a vertical direction and a gear-and-ratchet drive for advancing the support along the conveying path and stopping it in a desired position with respect to the adjacent manipulating device at a respective one of the work stations to enable the manipulating device to remove single parts from the holders and to place them on the assembly support.

* * * * *